UNITED STATES PATENT OFFICE 2,373,058

PROCESS FOR PREPARING SYNTHETIC RESIN

Samuel H. Silberkraus, Springfield, Mass., assignor to Monsanto Chemical Company, St. Louis, Mo., a corporation of Delaware No Drawing. Application January 5, 1942, Serial No. 425,597

8 Claims. (Cl. 260—51)

This invention relates to an improved process for preparing phenol-aldehyde condensation products and, more particularly, phenol-acetaldehyde condensation products.

Condensation products of phenols with aldehydes have long been known. The preparation of such products generally comprises preparing a mixture of the phenol, the aldehyde and a suitable condensing agent and then heating the resulting mixture under suitable conditions, for example, under a water-cooled reflux condenser at temperatures approximating 100° C. However, such a method of preparing phenolic condensation products has not been entirely satisfactory. For example, when the material to be reacted with the phenol is highly volatile, substantial amounts tend to be lost by evaporation from the reaction mixture.

According to the present invention, condensation products of phenols with aldehydes are prepared by combining an aldehyde with a phenol preheated to a temperature between the boiling point of the phenol and a temperature appreciably above the reflux temperature of the ultimate water-containing reaction product. An initial phenol temperature between substantially 125° C. and the boiling point of the phenol has been found very satisfactory.

While the process of the present invention is adaptable to reactions between phenols and aldehydes in general, the process of this invention is particularly adaptable for reacting phenols with aldehydes tending to be lost by volatilization under reaction conditions, such as acetaldehyde, propionaldehyde and butyraldehyde acrolein, and the like saturated and unsaturated aliphatic aldehydes. The phenol employed is preferably a monohydric phenol, for example, phenol, cresol, xylenol and the like but when advantageous polyhydric phenols may be employed, as for example, resorcinol, catechol, hydroquinone, and the like. Furthermore, mixtures of phenols may be employed, for example, mixtures of monohydric phenols or mixtures of monohydric phenols with polyhydric phenols, such as mixtures of phenol and resorcinol. Thus, in accordance with the invention, by passing an aldehyde into a phenol preheated to a temperature within the above-described temperature limits, numerous advantages ensue. For example, the introduction of the aldehyde may be relatively rapid without substantial loss of even the more volatile aldehydes such as acetaldehyde, by evaporation. Furthermore, since the concentration of unreacted aldehyde present in the reaction mixture at any one time tends to be low, conversion of the aldehyde into undesirable side products tends to be repressed.

More particularly a phenol is reacted with an aldehyde, such as acetaldehyde, by passing the acetaldehyde into the phenol initially heated within the above described temperature limits and preferably between 150° C. and 160° C., the reaction being carried out under reflux conditions, for example, under a moderately cooled reflux condenser, preferably a water-cooled reflux condenser and the rate of introduction of the acetaldehyde preferably being regulated to correspond to the rate of absorption of the aldehyde. In carrying out this reaction it is generally preferred that condensing agents be present thereby regulating the pH of the reaction mixture. Such condensing agents should be non-volatile under the reaction conditions and preferably comprise such non-volatile mineral acids as sulphuric, phosphoric and the like.

As is well known, acetaldehyde is a highly volatile material and substantial amounts tend to be lost when an attempt is made to react it with a phenol under customary reaction conditions, for example, in a vessel equipped with a water-cooled reflux condenser, the reaction mixture being heated at substantially 100° C. While operating under pressure tends to avoid loss of aldehyde, apparatus capable of resisting pressure is expensive and its use tends to be cumbersome. Furthermore, even the use of polymeric forms of acetaldehyde such as paraldehyde does not avoid this difficulty since such polymeric forms break down readily under reaction conditions to give acetaldehyde.

However, by operating according to the present invention it has surprisingly been discovered that the rate of absorption of the acetaldehyde far exceeds that obtained under the above mentioned customary lower temperature reaction conditions and the products obtained under the otherwise identical conditions tend to possess superior properties.

The following example is illustrative of the present invention as applied to the preparation of a permanently fusible phenol-acetaldehyde resin, the parts being parts by weight.

Example 100 parts of phenol and 1.0 part of sulphuric acid (concentration 96%) were placed in a suitable vessel equipped with a water-cooled reflux condenser. The foregoing mixture was then heated to substantially 150–160° C. and thereafter 45 parts of liquid acetaldehyde were passed into the mixture over a two and one-half hour period. During this period the temperature slowly dropped as water of reaction formed and refluxing started until, by the time all the acetaldehyde had been added, the temperature of the product had dropped to substantially 100° C. Thereafter, the mixture was refluxed for two hours to advance the resinification of the reaction mixture. Then, the resinous product was dehydrated under vacuum, the temperature of the resin being gradually raised during the dehydration until a temperature of substantially 125–150° C. was attained. A brittle, readily grindable resin was obtained, which remained fusible on heating at 150° C., for example, after 30 minutes heating at this temperature. The yield of resin indicated that substantially all of the acetaldehyde had reacted.

In contrast to the foregoing results, when the process of the example was repeated using the same rate of introduction of acetaldehyde but preheating the phenol-acid mixture initially to only 100° C., a substantially lower yield of a relatively soft, non-grindable resin was obtained.

In further contrast to the results obtained by the process employed in the example, when a mixture comprising phenol, sulphuric acid and all the acetaldehyde was prepared and then reacted under reflux conditions, a substantially lower yield of a soft, non-grindable resin was obtained.

The outstanding results obtained by operating according to the process set forth in the example are most unexpected and surprising when it is considered that the absorption of highly volatile acetaldehyde was not decreased but greatly increased by raising the temperature of the phenol. Thus, while gases generally show a lower absorption in liquids at higher temperatures, in the present instance the effective absorption of acetaldehyde was greatly increased.

The product of the example may be employed for the customary uses of permanently fusible phenol aldehyde resins. Such uses include further reaction with aldehydes to form infusible products. For example, molded products may be prepared by incorporating suitable amounts of hexamethylenetetramine, or other methylene-containing hardening agents, such as formaldehyde, paraformaldehyde and the like, fillers, lubricants, etc. in the usual manner and then forming the desired article in a suitable mold by the application of heat and pressure. Thus, for example, a molding powder may be prepared from the product described in the example in the following manner.

100 parts of resin prepared as in the example are mixed with 10 to 15 parts of hexamethylenetetramine, up to 3 parts of hydrated lime, ½ to 1½ parts of zinc stearate and ½ to 1½ parts of calcium stearate in a suitable grinder at room temperature and thereafter on mixing rolls at 100–105° C. for 1 to 2 minutes in the well-known manner. During the mixing on the rolls, for every 45 to 55 parts of the above mixture from 41 to 53 parts of a suitable filler and a suitable amount of coloring matter are incorporated in the mixture. Illustrative of the fillers that may be employed are wood flour, asbestos, china clay, cotton flock, chopped canvas, or any combination of these fillers and the like.

The resulting product may then be comminuted and otherwise prepared for hot molding operations. Subjection of the resulting molding powder to heat and pressure, for example, 2000 pounds per square inch pressure and a temperature of 165° C. converts it into a durable, infusible product.

The foregoing is a description of the preparation of infusible products by a process well-known as a two-step process. However, the present invention is not limited to such a process. Thus, for example, when advantageous, a sufficient amount of an aldehyde, for example, acetaldehyde may be introduced in one step so as to form a product capable of hardening to an infusible product simply by the application of heat.

While the process of this invention is particularly adaptable to reactions between liquid acetaldehyde and phenols containing a single benzene nucleus, especially phenol itself, when advantageous, gaseous acetaldehyde or polymers of acetaldehyde such as paraldehyde may be suitably employed in place of liquid acetaldehyde.

This invention is limited solely by the claims attached hereto.

What is claimed is:

1. In a process for preparing phenol-aldehyde condensation products, the step which comprises introducing an aldehyde into a phenol preheated to a temperature between the boiling point of the phenol and a temperature appreciably above the reflux temperature of the ultimate water-containing reaction product while condensing and returning substantially all of the volatilized materials to the reaction mixture, the rate of introduction of the aldehyde into the phenol corresponding substantially to the rate of absorption therein.

2. In a process for preparing phenol-aldehyde condensation products, the step which comprises introducing an aldehyde into a mixture of a phenol and a condensing agent preheated to a temperature between the boiling point of the phenol and a temperature appreciably above the reflux temperature of the ultimate water-containing reaction product while condensing and returning substantially all of the volatilized materials to the reaction mixture, the rate of introduction of the aldehyde into the phenol corresponding substantially to the rate of absorption therein.

3. In a process for preparing phenol-aldehyde condensation products, the step which comprises introducing an aliphatic aldehyde into a mixture of a phenol and a condensing agent preheated to a temperature between the boiling point of the phenol and a temperature appreciably above the reflux temperature of the ultimate water-containing reaction product while condensing and returning substantially all of the volatilized materials to the reaction mixture, the rate of introduction of the aldehyde into the phenol corresponding substantially to the rate of absorption therein.

4. In a process for preparing phenol-aldehyde condensation products, the steps which comprise introducing an aldehyde into a mixture of a phenol and a mineral acid condensing agent substantially non-volatile under the reaction conditions, while preventing escape of substantially any of the volatilized materials by means of a water-cooled return condenser, said mixture being preheated to a temperature between substantially 125° C. and the boiling point of the phenol, until refluxing begins and continuing the introduction of the aldehyde and the refluxing of the mixture at the gradually decreasing reflux temperature of the reaction mixture, the rate of introduction of the aldehyde into the phenol corresponding substantially to the rate of absorption therein.

5. In a process for preparing phenol-acetaldehyde condensation products, the step which comprises introducing acetaldehyde into a phenol preheated to a temperature between the boiling point of the phenol and a temperature appreciably above the reflux temperature of the ultimate water-containing reaction product while condensing and returning substantially all of the volatilized materials to the reaction mixture, the rate of introduction of the acetaldehyde into the phenol corresponding substantially to the rate of absorption therein.

6. In a process for preparing a phenol-acetaldehyde condensation product, the step which comprises introducing acetaldehyde into a mixture of phenol and a mineral acid condensing agent substantially non-volatile under the reaction conditions, while condensing and returning substantially all of the volatilized materials to the reaction mixture, said mixture being preheated to a temperature between the boiling point of the phenol and a temperature appreciably above the reflux temperature of the ultimate water-containing reaction product and the rate of introduction of the acetaldehyde into the phenol corresponding substantially to the rate of absorption therein.

7. In a process for reacting phenol with acetaldehyde, the steps which comprise introducing the acetaldehyde into a mixture of phenol and a catalytic amount of sulfuric acid while preventing escape of substantially any of the volatilized materials by means of a sufficiently cooled return condenser, said mixture being preheated to a temperature between substantially 125° C. and the boiling point of the phenol, until refluxing begins and continuing the introduction of the acetaldehyde and the heating of the reaction mixture at the gradually decreasing reflux temperature of the reaction mixture, the rate of introduction of the acetaldehyde into the phenol corresponding substantially to the rate of absorption therein.

8. In a process for preparing a permanently fusible phenolacetaldehyde resin the steps which comprise introducing acetaldehyde into a mixture comprising phenol and a catalytic amount of sulfuric acid while preventing the escape of substantially any of the volatilized materials by means of a water-cooled return condenser, said mixture being preheated to 150–160° C., until refluxing begins and continuing the introduction of the acetaldehyde and the heating of the reaction mixture at the gradually decreasing reflux temperature of the reaction mixture until slightly less than one mol of acetaldehyde for each mol of phenol present has been absorbed and thereafter refluxing the reaction mixture until the desired degree of resinification has taken place, the rate of introduction of the acetaldehyde into the phenol corresponding substantially to the rate of absorption therein.

SAMUEL H. SILBERKRAUS.